Oct. 7, 1958  M. SACKS  2,855,216
MOVABLE SAFETY DASHBOARD FOR AUTOMOTIVE VEHICLES
Filed May 1, 1956  2 Sheets-Sheet 1
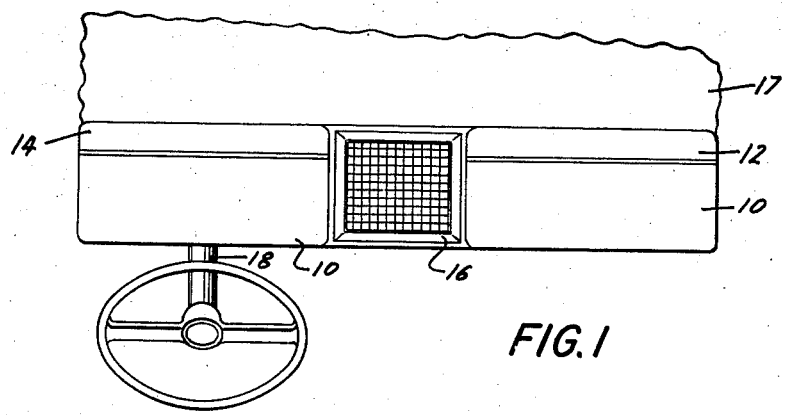
FIG. 1
FIG. 2
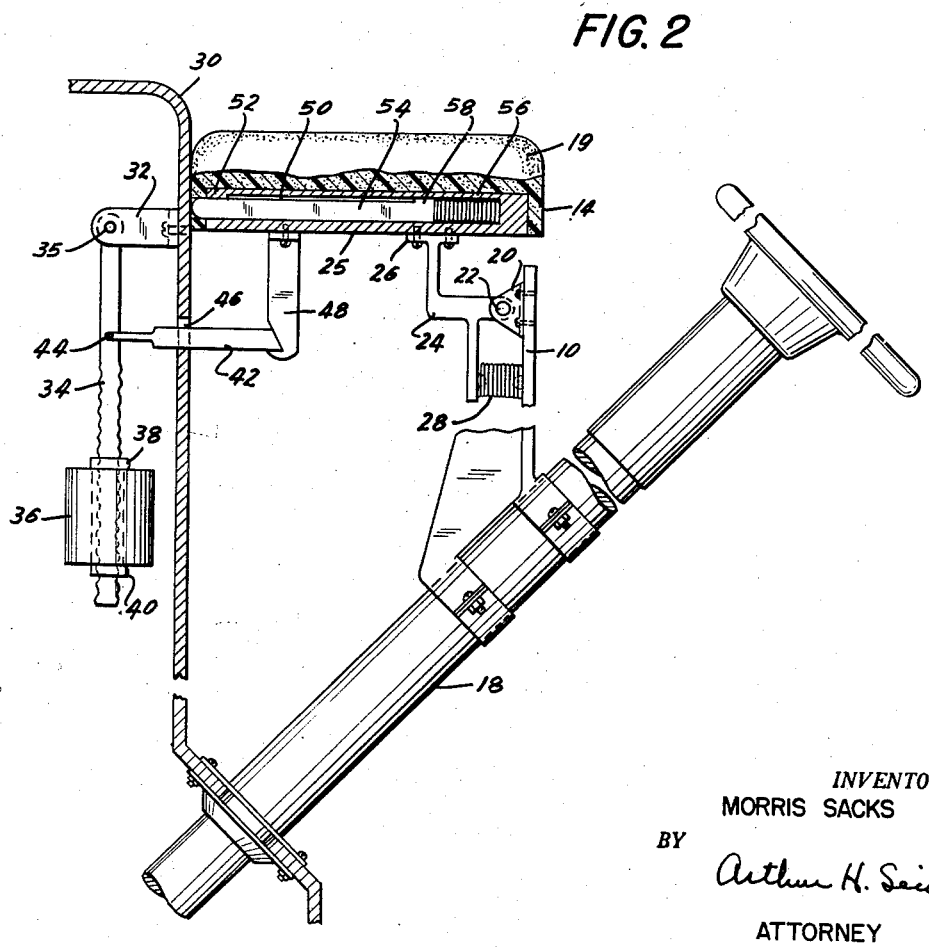
INVENTOR.
MORRIS SACKS
BY
Arthur H. Seidel
ATTORNEY

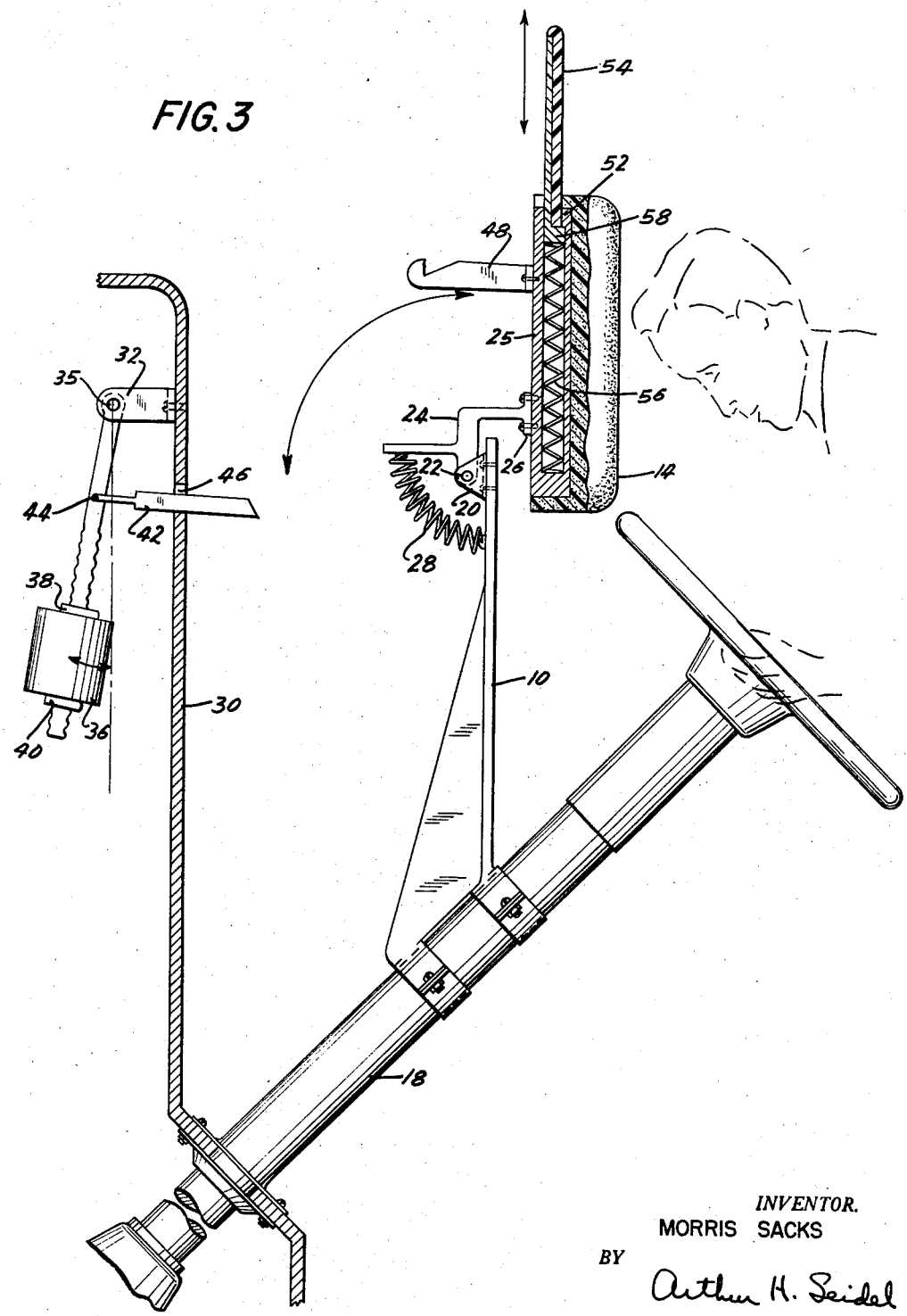

United States Patent Office 2,855,216
Patented Oct. 7, 1958

2,855,216

MOVABLE SAFETY DASHBOARD FOR AUTOMOTIVE VEHICLES

Morris Sacks, Oxford, Pa.

Application May 1, 1956, Serial No. 581,939

2 Claims. (Cl. 280—150)

The present invention relates to a movable safety dashboard for automotive vehicles, and in particular, to a pivotal, cushioned dashboard to protect the occupants of the front seat of an automotive vehicle against injury.

In a sudden stop, or lurch of an automotive vehicle, and particularly, in an impact collision, the driver is generally prewarned and is able to take at least some steps to brace himself against injury. Moreover, the driver of an automotive vehicle, even when not provided with a safety belt, has the steering wheel and steering column in front of him to absorb the shock of impact. However, notwithstanding this, the driver is prone to hurtle forwardly and upwardly, and thereby dash his head into the windshield.

The occupant of the right-hand front seat of an automotive vehicle is most prone to injury, and statistics prove that this seat is the most dangerous of all the seats in a vehicle. Attempts have been made to protect the occupant of the right front seat against injury, as by padding the dashboard and glove compartment, and providing safety belts and the like. However, as of the present, there is no adequate means available for insuring that the head of the occupant of the front seat will not be urged through the windshield or dashboard as a result of a sudden impact from a sharp lurch or collision.

Thus, most, if not all safety belts comprise means encircling the waist of the user for retaining the user's body fixedly anchored to the seat. In severe collisions, and when there are sudden lurches, the safety belt user's head is prone to move forward with the safety belt serving as a fulcrum about which the upper portion of the user's body is pivoted. In the absence of a safety belt, the forward movement of the user's head is even more accentuated. Under these circumstances the user's head is prone to strike the dashboard or windshield with a large amount of force, resulting in severe injuries and possibly in death.

This invention has as an object the provision of a pivotable safety device, which pivots into action upon a sudden severe lurch or stoppage of the vehicle.

This invention has as another object the provision of a safety device for preventing injury to the occupants of the front seat of an automotive vehicle.

For the purpose of illustrating the invention there are shown in the drawings a form which is presently preferred; it being understood, however, that this invention is not limited to the precise arrangements and instrumentalities shown.

Referring to the drawings wherein like reference characters refer to like parts;

Figure 1 is a fragmentary view of the dashboard, steering column and windshield of an automotive vehicle incorporating the present invention.

Figure 2 is a fragmentary sectional view of the mechanism of the present invention in its normally disposed position.

Figure 3 is a fragmentary sectional view of the mechanism of the present invention in its withdrawn position, shielding the driver from injury.

Referring to the drawings, 10 designates the dashboard of an automotive vehicle equipped with the present invention. In the form of dashboard here illustrated, a pair of cushioning members 12 and 14 are shown positioned respectively on either side of radio loudspeaker grill 16 below windshield 17. Cushioning member 14 is primarily intended to protect the driver while cushioning member 12 is primarily intended to protect the occupant of the right front seat, with both cushioning members 12 and 14 serving to protect the occupant of the center portion of the front seat.

While in the illustrated embodiment, a pair of cushioning members 12 and 14 are shown, it is, of course, to be understood that a different number of cushioning members may be used. For example, in certain embodiments, a cushioning member may be provided only for the occupant of the right front seat.

A steering column 18 is operatively disposed in relation to dashboard 10. Steering column 18 may be of conventional design, but preferably, for maximum safety should be of the collapsible type described in my copending patent application Serial No. 581,940 filed on even date herewith, now Patent No. 2,803,970.

The cushioning member 14 comprises a pad 19 of foam rubber or similar cushioning material mounted upon the dashboard 10 by means of one or more ears 20 through which a pivot pin 22 is inserted. Pivot pin 22 carries a bent pivot lever 24 and serves as a fulcrum for it. One end of bent pivot lever 24 is fixedly secured to the metallic back plate 25 of cushioning member 14 by means of flange 26. The other end of lever 24 is connected by means of a coil compression spring 28 to dashboard 10.

The forward end of cushioning member 14 is adjacent fire wall 30. An ear 32 is secured to the motor side of fire wall 30. A pendulum 34 carried on pivot 35 depends from ear 32. Preferably, the pendulum 34 constitutes a rod having a corrugated outer surface. A weight 36 having a tubular bore is carried on pendulum 34 intermediate split pins 38 and 40 which embrace the pendulum 34. This permits the relative height of the weight 36 on pendulum 34 to be readily adjusted.

A clevis 42 is engaged with pendulum 34 by means of cross-pin 44. Clevis 42 extends through opening 46 in fire wall 30, and engages with a notch in hook 48. Hook 48 is bolted to and dependent from the back plate 25 of cushioning member 14. The relative height of weight 36 on pendulum 34 is adjusted so that only a pronounced sudden stop, as would arise in a collision, will urge pendulum 34 sufficiently forward so that clevis 42 will become disengaged from the notch in hook 48.

The back plate 25 of cushioning member 14 is provided with an elongated cavity 50, whose walls run parallel to the upper surface of the cushioning member 14 and whose mouth is juxtaposed to fire wall 30. An inwardly directed stop member 52 is positioned adjacent the mouth portion of cavity 50.

A shield 54 is positioned within cavity 50 and is spring-urged by means of spring 56 against fire wall 30 when cushioning member 14 is disposed in its normal position with the mouth of cavity 50 juxtaposed to fire wall 30.

A stop member 58 is carried on the upper surface of shield 54 in a position such that it may engage with stop member 52.

As shown particularly in Figure 3 the shield 54 comprises a back plate 60 of metal, or plywood, and a facing ply 62 of foam rubber or other resilient shock-absorbing material. The back plate 60 acts as a support for the foam rubber ply 62.

While cushioning member 14 has been described in detail, it is, of course, to be understood that the structure of cushioning member 12 is similar to that of cushioning member 14, and hence the aforesaid description is applicable to cushioning member 12.

The operation of the device of the present invention is as follows:

Upon a sudden stop of the vehicle arising from a collision or other unusual circumstances, the weight 36 carried on pendulum 34 moves forward a sufficient distance such that clevis 42 becomes disengaged from the notch in hook 48. As above indicated the position of weight 36 on pendulum 34 is adjusted so that only a severe stop will displace pendulum 34 sufficiently so that clevis 42 is moved out of engagement with hook 48.

Upon the disengagement of hook 48, the cushioning member 14 is pivoted about pivot pin 22 by compression spring 28 so that cushioning member 14 assumes an upright position. Simultaneously, cushioning member 12 is also pivoted to an upright position. Shield 54 is urged upwardly by spring 56 to the position shown in Figure 3, in which position it covers the windshield 17. In the aforesaid manner, the head of the driver is prevented from contacting the windshield 17, and moreover the entire body of the driver is prevented from moving forward an appreciable distance.

The cushioning members 12 and 14 can be readily returned to their normal positions, with shield 54 being manually retracted and clevis 42 engaging hook 48.

The present invention may be embodied in other specific forms without departing from the spirit or essential attributes thereof and, accordingly, reference should be made to the appended claims, rather than to the foregoing specification as indicating the scope of the invention.

I claim:

1. In an automotive vehicle the combination comprising a windshield, a dashboard beneath said windshield, a firewall spaced from said dashboard, at least one cushioning member disposed on said dashboard, said cushioning member being movable between a first position wherein it is at least substantially beneath said windshield and in which position one end of said cushioning member is juxtaposed to said firewall, and a second position wherein it blocks said windshield and prevents contact by occupants of the vehicle with said windshield, a slot in the end of said cushioning member juxtaposed to said firewall, a shield disposed within said cushioning member, said shield being reciprocally movable so that a portion thereof may be passed through said slot, spring means within said cushioning member for urging said shield through said slot, spring means normally urging said cushioning member to the second position, means for locking said cushioning member in the first position, and control means connected to said locking means responsive to the sudden stopping of the vehicle for disengaging said locking means and releasing the cushioning member from the first position to its second position.

2. In an automotive vehicle the combination comprising a windshield, a dashboard beneath said windshield, a firewall spaced from said dashboard, at least one cushioning member disposed on said dashboard, said cushioning member being movable between a first position wherein it is at least substantially beneath said windshield and in which position one end of said cushioning member is juxtaposed to said firewall, and a second position wherein it blocks said windshield and prevents contact by occupants of the vehicle with said windshield, a slot in the end of said cushioning member juxtaposed to said firewall, a shield disposed within said cushioning member, said shield being reciprocally movable so that a portion thereof may be passed through said slot, spring means within said cushioning member for urging said shield through said slot, spring means normally urging said cushioning member to the second position, a pendulum carrying a weight suspended adjacent said cushioning member, a hook depending from said cushioning member, a locking member joined to said pendulum for operatively engaging said hook when said cushioning member is disposed in its first position, with said pendulum being responsive to the sudden stopping of the vehicle, whereby movement of the pendulum disengages said locking member from said hook.

References Cited in the file of this patent

UNITED STATES PATENTS

| 2,050,141 | Wethington | Aug. 4, 1936 |
| 2,755,125 | Hodges | July 17, 1956 |
| 2,806,737 | Maxwell | Sept. 17, 1957 |

FOREIGN PATENTS

| 1,031,160 | France | Mar. 18, 1953 |
| 1,097,854 | France | Feb. 23, 1955 |
| 897,053 | Germany | Nov. 16, 1953 |
| 739,676 | Great Britain | Nov. 2, 1955 |
| 152,315 | Sweden | Nov. 8, 1955 |